Sept. 22, 1925.
R. SCHWARZ
CUTTING FILES
Filed March 6, 1924
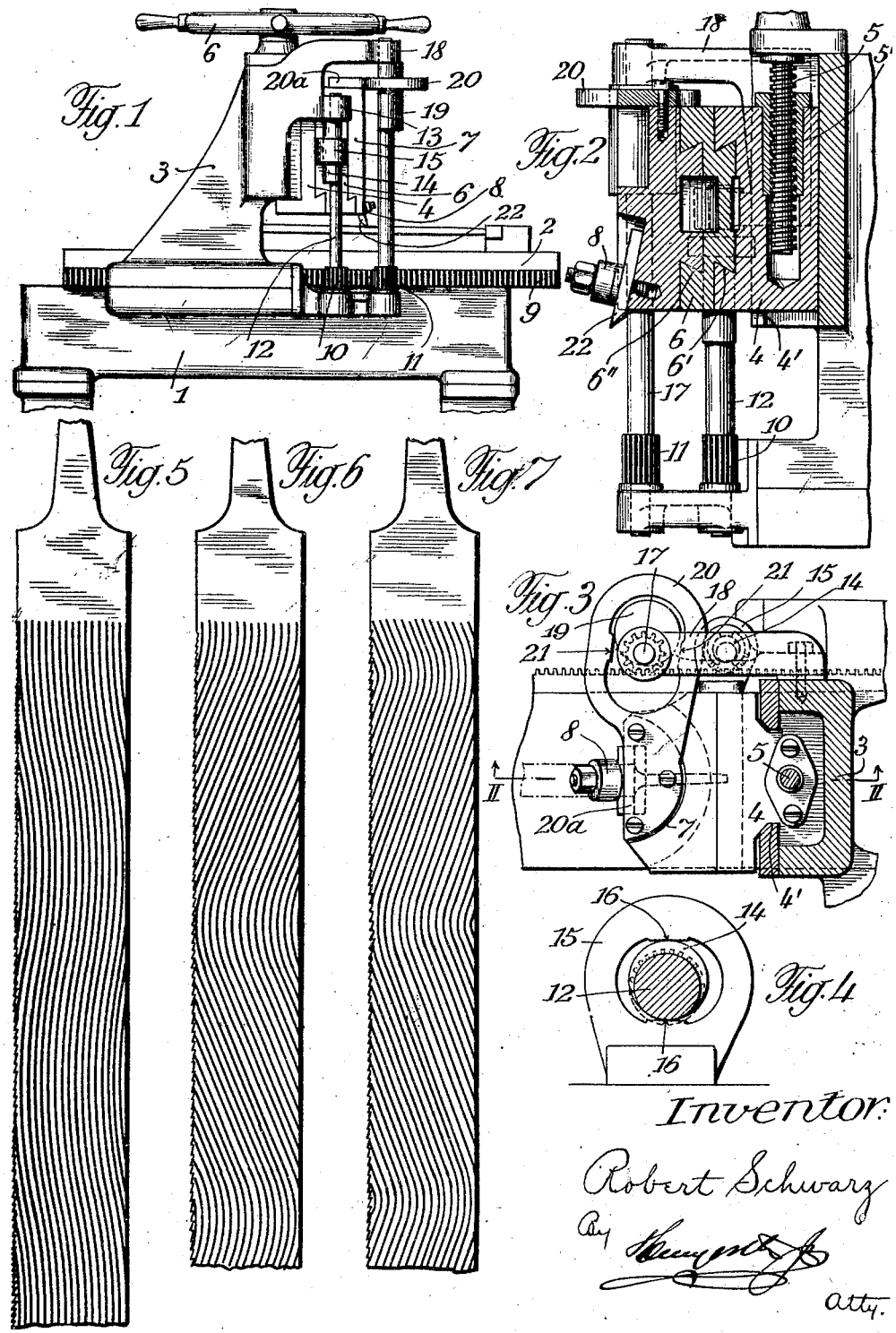
Inventor:
Robert Schwarz
By [signature]
atty.

Patented Sept. 22, 1925.

1,554,884

UNITED STATES PATENT OFFICE.

ROBERT SCHWARZ, OF GRUZE, NEAR WINTERTHUR, SWITZERLAND.

CUTTING FILES.

Application filed March 6, 1924. Serial No. 697,345.

*To all whom it may concern:*

Be it known that I, ROBERT SCHWARZ, a citizen of the Republic of Switzerland, residing at Gruze, near Winterthur, Switzerland, have invented certain new and useful Improvements in Cutting Files, of which the following is a specification, reference being had therein to the accompanying drawing.

The present invention relates to a method and a device for producing files and to files of a novel type.

The method according to the invention comprises the novel step of providing files with the first or lower cut by planing out of the file blank parallel grooves extending approximately in the longitudinal direction of the file, said grooves changing their direction frequently so that grooves of a wavy character are obtained. The second cut is applied according to any of the known methods, for instance by means of a file cutting machine.

With the ordinary files the file ribs are forced up or swaged up from the surface of the file-blanks by means of punchers or cutters; the second cut alters to some extent the material which has been raised up by the first cut. The type of files according to the invention, in which the first cut is produced in the form of wavy grooves extending in the longitudinal direction of the file by a planing action, by which the material in the grooves is completely removed so that by applying the second cut properly shaped, sharp teeth are obtained, presents many advantages as compared with the ordinary cross-cut files. The small teeth are not situated one behind the other as in the case in files having a straight first cut, but are staggered, therefore the small teeth work more uniformly on the material to be filed, the filing can be performed much quicker and the filed surface is smoother; further the planed first cut provides for a good guidance of the file and prevents the file to glide off a blank in the lateral direction.

The device for cutting files according to the present invention is characterized by the fact that a tool-holder is operatively connected to the frame work of the device by means of two slides, one adapted to glide in the other, the movement of one slide causing an annular adjustment of the planing tool so that the cutting edge stands in every point at right angles to the direction of the longitudinal grooves, whilst the movement of the other slide causes the displacement of the first slide in the lateral direction which corresponds to the lateral deviation from a straight line of the longitudinal grooves.

A constructional example of the device according to the present invention is illustrated in the accompanying drawings, in which:

Fig. 1 is a side elevation of the device,

Fig. 2 shows on an enlarged scale a vertical section along line II—II in Fig. 3, Fig. 3 is a plan view of Fig. 2 with the upright shown in section, Fig. 4 is a plan view of a detail and Figs. 5–7 show different file blanks provided with the first cut.

In order to provide a file-blank with a planed first cut a rack-like toothed planing tool 22 is so guided over the surface of the file blank that parallel grooves corresponding to the toothing of the tool are obtained which are of a wavy character, file blanks provided with the first cut obtained by this treatment are illustrated in Fig. 5.

The device for cutting files of this type as illustrated on the drawings consists mainly of a table planing machine. The planing table 2 is reciprocated in a known manner in the longitudinal direction of the machine frame 1 and moves past the upright 3 fixed to the frame 1.

The upright 3 is provided with a member 4 movable in vertical guides 4' and adapted to be adjusted in its vertical position by means of a screw threaded spindle 5 cooperating with a nut 5' fixed in the member 4. The screw threaded spindle 5 is turned one way or the other by means of a hand wheel 6. The member 4 is provided with horizontal prismatic guides 6' along which a slide 6 is adapted to move. The flat slide 6 in its turn is provided with horizontal circular prismatic guides 6'' along which a segment slide 7 is movably arranged; the tool holder 8 is arranged on the slide 7. The motion of the slides 6 and 7 is obtained by means of cam discs or eccentrics the turning movement of which is derived from the reciprocating movement of the planing table 2. To this end a toothed rack 9 is provided on the longitudinal side of the table, with which two pinions 10 and 11 mounted at the side of the upright 3 are in mesh.

The shaft 12 of the pinion 10, which actuates the slide 6, carries at its upper end, which is mounted in a bracket 13 of the upright 3, an eccentric or cam 14, the width of which corresponds approximately to the amount by which the slide may be lifted. The eccentric 14 is adapted to turn within the eccentric strap 15 provided with two working faces 16 (as shown in Fig. 4). The shaft 17 of the pinion 11, which actuates the segment slide 7 carries at its upper end, which is mounted in the bracket 18 of the upright 3 an eccentric 19 the width of which also corresponds to the amount by which the slide 6 may be lifted. The eccentric 19 is adapted to turn within an eccentric strap 20 fixed by means of an extension 20ª to the upper part of the segment slide 7, the eccentric strap 20 being provided with two working faces 21. It is evident that the slide 6 causes the wavy character of the grooves by causing a to and fro displacement of the planing tool 22 in the lateral direction. The action of the eccentric 19 causes such an angular adjustment of the segment slide 7 that the cutting teeth of the planing tool, which are arranged in a straight line, are at every point at right angles to the tangent drawn to the wavy line in that point. This adjustment of the angular position of the tool is necessary in order to obtain clean grooves and to prevent a lateral edging and blunting of the tool.

In Fig. 3 the two slides are shown in the position which they take up in the moment immediately before a change in the direction is effected.

Fig. 5 shows a file into which a first cut in the shape of wavy lines has been planed.

With eccentrics or cams of different shape the grooves may be differently shaped, for instance they may be composed of straight parts and curved parts as is shown in Fig. 6 or they may be shaped to the greatest extent as straight lines arranged in zig-zag fashion as is diagrammatically shown in Fig. 7.

I claim:

1. The method of making files, which comprises cutting the first set of grooves in a blank of a wavy character while maintaining the direction of cut at every point corresponding to the tangent of a groove.

2. The method of making files, which comprises planing in the blank a series of parallel wavy grooves extending longitudinally of the blank, while shifting the planing tool to maintain it perpendicular to the tangent of a groove.

3. The method of making files, which comprises reciprocating a blank beneath a cutting tool and automatically maintaining the tool perpendicular to the tangent of a groove.

4. The method of making files, which comprises longitudinally reciprocating a blank beneath a cutting tool and simultaneously and automatically laterally shifting the tool while imparting partial rotation thereto in accordance with the shape of a groove to maintain the plane of the cutting edge of the tool perpendicular to the tangent of the groove at the point being cut.

5. In a device for cutting files in combination a reciprocating table adapted to hold the file-blank, a rack-like planing tool, a tool-holder, a stationary frame part, two slides interposed between the tool-holder and the stationary frame part, and operative connections between said slides and the table whereby to the planing tool is imparted a movement in the lateral direction of the file-blank and simultaneously an angular adjustment so that the cutting edge of the planing tool stands at right angles in every point to the direction of the longitudinal grooves planed into the file-blank as the first cut, the grooves obtained changing their direction repeatedly.

6. In a device for cutting files in combination, a reciprocating table adapted to hold a file-blank, a rack-like planing tool, a tool-holder, a stationary frame part, two slides one mounted upon the other and interposed between the tool-holder and the stationary frame-part, an operative connection between one of said slides and the reciprocating table for imparting a to and fro movement in the lateral direction of the file-blank to this slide, and an operative connection between the other of said slides and the reciprocating table to cause an angular adjustment of the planing tool, so that the edge of the latter stands at right angles in every point to the direction of the longitudinal grooves planed into the file-blank as a first cut, the grooves obtained changing their direction repeatedly.

7. In a device for cutting files in combination, a reciprocating table adapted to hold the file-blank, a rack-like planing tool, a tool-holder, a stationary frame part, a first slide adapted to move in horizontal guides in a lateral direction of the file-blank, a second slide carrying the tool-holder and adapted to move in horizontal circular guides provided on the first slide, an operative connection between one of said slides and the reciprocating table for imparting a to and fro movement in the lateral direction of the file blank to this slide, and an operative connection between the other of said slides and the reciprocating table to cause an angular adjustment of the planing tool, so that the edge of the latter stands at right angles in ever point to the direction of the longitudinal grooves planed into the file-blank as a first cut, the grooves obtained changing their direction repeatedly.

8. In a device for cutting files in combination, a reciprocating table adapted to hold the file-blank, a rack-like planing tool, a tool-holder, a stationary frame part, a flat first slide adapted to move in straight horizontal prismatic guides in a lateral direction of the file-blank, a segment shaped second slide carrying the tool-holder and adapted to move in horizontal circular guides provided on the first slide, an operative connection between one of said slides and the reciprocating table for imparting a to and fro movement in the lateral direction of the file blank to this slide, and an operative connection between the other of said slides and the reciprocating table to cause an angular adjustment of the planing tool, so that the edge of the latter stands at right angles in every point to the direction of the longitudinal grooves planed into the file-blank as a first cut, the grooves obtained changing their direction repeatedly.

9. In a device for cutting files in combination, a reciprocating table adapted to hold the file-blank, a rack-like planing tool, a tool-holder, a stationary frame part, a toothed rack provided on said reciprocating table, two slides glidably mounted one upon the other and interposed between the tool-holder and the stationary frame part, a pinion meshing with said toothed rack, an axle carrying said pinion and rotatably mounted in said stationary frame part, an eccentric fixed to said axle, an eccentric strap fixed to one of said slides and co-operating with said eccentric for imparting a to and fro movement in the lateral direction of the file blank to this slide, a second pinion meshing with said toothed rack, a second axle carrying said second pinion and rotatably mounted in said stationary frame part, an eccentric fixed to said second axle, an eccentric strap fixed to the second of said slides and co-operating with the eccentric for causing an angular adjustment of the second slide and thereby of the planing tool so that the edge of the latter stands at right angles in every point to the direction of the longitudinal grooves planed into the file-blank as a first cut, the grooves obtained changing their direction repeatedly.

10. In a device for cutting files in combination, a reciprocating table adapted to hold the file-blank, a rack-line planing tool, a tool-holder, a stationary frame part, a toothed rack provided on said reciprocating table, a first slide adapted to move in horizontal guides in a lateral direction of the file-blank, a second slide carrying the tool holder and adapted to move in horizontal circular guides provided on the first slide, a pinion meshing with said toothed rack, an axle carrying said pinion and rotatably mounted in said stationary frame part, an eccentric fixed to said axle, an eccentric strap fixed to said first slide and co-operating with said eccentric for imparting a to and fro movement in the lateral direction of the file-blank to this slide, a second pinion meshing with said toothed rack, a second axle carrying said second pinion and rotatably mounted in said stationary frame part, an eccentric fixed to said second axle, an eccentric strap fixed to the second slide and co-operating with the eccentric for causing an angular adjustment of the second slide and thereby of the planing tool, so that the edge of the latter stands at right angles in every point to the direction of the longitudinal grooves planed into the file-blank as a first cut, the grooves obtained changing their direction repeatedly.

In testimony whereof I affix my signature.

ROBERT SCHWARZ.